US010455156B2

(12) United States Patent
Lagnado et al.

(10) Patent No.: US 10,455,156 B2
(45) Date of Patent: Oct. 22, 2019

(54) USING UNIDIRECTIONAL AND OMNIDIRECTIONAL ANTENNAS TO DETERMINE WHETHER OBJECT IMAGE IS IN CAMERA VIEWFINDER (71) Applicant: Hewlett-Packard Development Company, L.P., Houston, TX (US)

(72) Inventors: Isaac Lagnado, Houston, TX (US); Vali Ali, Cypress, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/772,270

(22) PCT Filed: Feb. 29, 2016

(86) PCT No.: PCT/US2016/020098
§ 371 (c)(1),
(2) Date: Apr. 30, 2018

(87) PCT Pub. No.: WO2017/151097
PCT Pub. Date: Sep. 8, 2017

(65) Prior Publication Data
US 2019/0007621 A1 Jan. 3, 2019

(51) Int. Cl.
*H04N 5/232* (2006.01)
*H04N 5/225* (2006.01)
(Continued)

(52) U.S. Cl.
CPC ........... *H04N 5/23293* (2013.01); *G01S 3/28* (2013.01); *G01S 3/34* (2013.01); *H04N 5/225* (2013.01);
(Continued)

(58) Field of Classification Search
CPC .... H04N 5/23293; H04N 5/445; H04N 5/225; H04N 5/232; G01S 3/28; G01S 3/34; H04W 74/06
See application file for complete search history.

(56) References Cited

U.S. PATENT DOCUMENTS 4,873,546 A 10/1989 Zahn et al.
6,431,679 B1 8/2002 Li et al.
(Continued)

FOREIGN PATENT DOCUMENTS

EP 1215887 A2 6/2002
WO WO-2015075072 5/2015

OTHER PUBLICATIONS

Sani, A.A, et al, "Directional Antenna Diversity for Mobile Devices: Characterization and Solutions", Sep. 20-24, 2010.

*Primary Examiner* — Lin Ye
*Assistant Examiner* — John H Morehead, III
(74) *Attorney, Agent, or Firm* — Trop, Pruner & Hu PC (57) ABSTRACT

A technique includes sensing energy emitted from an object using an omnidirectional antenna of electronic device and sensing the energy using a unidirectional antenna of the electronic device. The technique includes, based at least in part on the sensing of energy using the omnidirectional antenna and the sensing of the energy using the unidirectional antenna, determining whether an image of the object is displayed in a camera viewfinder of the electronic device. The technique includes selectively causing the electronic device to generate an output based at least in part on the determination.

20 Claims, 8 Drawing Sheets

(51) Int. Cl.
    *H04N 5/445*     (2011.01)
    *G01S 3/34*     (2006.01)
    *G01S 3/28*     (2006.01)
    *H04W 74/06*     (2009.01)

(52) U.S. Cl.
    CPC ............ *H04N 5/232* (2013.01); *H04N 5/445* (2013.01); *H04W 74/06* (2013.01)

(56) References Cited

U.S. PATENT DOCUMENTS

| | | | |
|---|---|---|---|
| 6,552,661 B1 | 4/2003 | Lastinger et al. | |
| 7,239,894 B2 | 7/2007 | Corbett et al. | |
| 8,009,099 B2 | 8/2011 | Kalliola et al. | |
| 2002/0054292 A1 | 5/2002 | Orelli et al. | |
| 2003/0123108 A1 | 7/2003 | Lin et al. | |
| 2008/0150804 A1* | 6/2008 | Kalliola | G01S 3/74 342/443 |
| 2009/0278949 A1 | 11/2009 | McMahan | |
| 2010/0066999 A1 | 3/2010 | Tatarczyk et al. | |
| 2011/0287789 A1* | 11/2011 | Yang | G01S 1/12 455/500 |
| 2013/0002402 A1* | 1/2013 | Guttman | G01S 3/38 340/8.1 |
| 2014/0274143 A1 | 9/2014 | Trantow | |
| 2015/0062335 A1 | 3/2015 | Murakami et al. | |
| 2015/0084744 A1 | 3/2015 | Havens | |

\* cited by examiner

USING UNIDIRECTIONAL AND OMNIDIRECTIONAL ANTENNAS TO DETERMINE WHETHER OBJECT IMAGE IS IN CAMERA VIEWFINDER

BACKGROUND

A mobile electronic device (a smartphone, a tablet computer, a laptop computer, and so forth) may contain a radio and an antenna for purposes of wireless communicating with nearby electronic devices, wireless access points, and so forth. The antenna may be an omnidirectional antenna, which, in general, has a uniform gain in a given plane.

DETAILED DESCRIPTION

Although a person may be in the vicinity of an electronic device (a laptop computer, a smartphone, a tablet computer, and so forth), which the person wants to physically locate and use, the electronic device's physical location may not be readily apparent to the person. For example, although the electronic device and the person may be in the same room, the device may be hidden behind another object in the room. As another example, the electronic device may have a physical appearance that is similar to the physical appearances of other electronic devices in the room (the electronic device may be a laptop computer in a laboratory containing other laptop computers, for example). As another example, the person may have identified the electronic device from a network scan. However, the person may be unaware of the electronic device's physical appearance or even the particular classification of the device (whether the device is a television, a portable computer or a smartphone, for example).

In accordance with example implementations that are described herein, a person searching for the physical location of a nearby electronic device (called an "object" herein) may use a mobile electronic device to assist in the searching. As examples, the object may be a laptop computer, a desktop computer, a tablet computer, a gaming station, a smartphone, a wearable electronic tag, a television, and so forth. In the following discussion, the person using the mobile electronic device to search for an object is a "user" of the mobile electronic device. As examples, the mobile electronic device that aids in the search for the object may be any portable electronic device having a camera and a display, such as a smartphone, a tablet computer, a laptop computer, a wristband-based computer, and so forth.

In the search for the object, the user may manipulate the position of the mobile electronic device to pan the electronic device's camera about the room while the user concurrently observes the electronic device's camera viewfinder. In this context, a "camera viewfinder" refers to an image that is displayed by the mobile electronic device and represents the image that is currently being captured by the electronic device's camera. In accordance with example implementations, the mobile electronic device provides an output (an indicator image on the camera viewfinder, a sound, a flashing light, and so forth) to alert the user to the object's appearance in the viewfinder so that, given the camera's image capturing direction and the viewfinder image, the user may identify the physical location of that object. In accordance with some implementations, the mobile electronic device displays an image near or at the center of the viewfinder when the electronic device determines that the object appears near or at the center of the viewfinder, for purposes of directing the user's attention to the object.

In accordance with example implementations, the object being located radiates electromagnetic energy, and the mobile electronic device has multiple antennas that the electronic device uses to sense this radiated electromagnetic energy. More specifically, in accordance with example implementations, the mobile electronic device includes an omnidirectional antenna and a unidirectional antenna. In accordance with example implementations, the omnidirectional antenna has an antenna gain pattern that is generally independent of the direction of the received energy from a transmitting source (such as the object); and the unidirectional antenna has a gain pattern that is sensitive to which direction the energy is received.

In this manner, the unidirectional antenna has a maximum peak gain in a particular direction. The orientation of the unidirectional antenna changes with the orientation of the mobile electronic device, and for a given orientation of the mobile electronic device, the difference between the maximum gain direction of the unidirectional antenna and the direction of the energy propagating from the object may be described by an angular vector. In accordance with example implementations, the angular vector may be represented in a spherical coordinate system as having an azimuth component and an altitude component.

In accordance with example implementations, the unidirectional antenna is aligned with a camera viewfinder of the mobile electronic device (i.e., aligned with the camera's field of vision) so that the maximum gain direction of the unidirectional antenna is aligned, or registered, with (parallel with, for example) the optical axis of the electronic device's camera. As further described herein, the mobile electronic device may measure the signal strengths of energies that are received by its unidirectional and omnidirectional antennas for purposes of constructing an indicator. In this manner, the mobile electronic device may use this indicator to determine when the camera is capturing an image of the object so that the electronic device may alert the user of the device.

Figure 1:
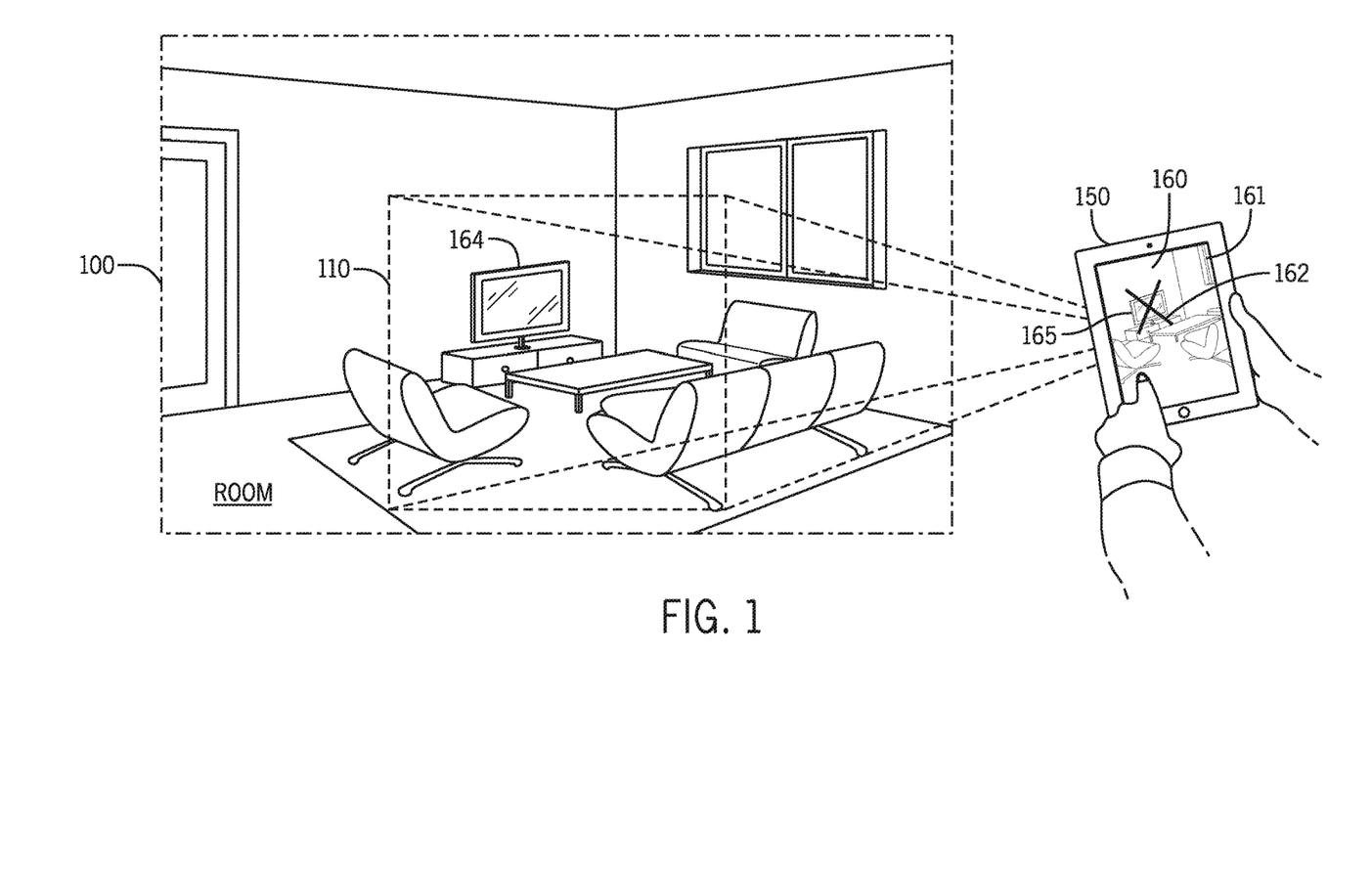
FIG. 1 is an illustration of the use of a mobile electronic device to identify the location of an object according to an example implementation.
Figure 2:
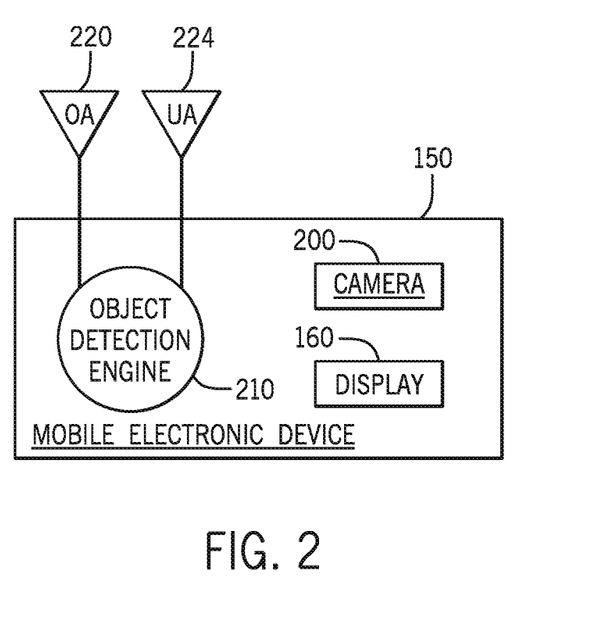
FIG. 2 is a schematic diagram of a mobile electronic device according to an example implementation.

Referring to FIG. 1 in conjunction with FIG. 2, more specifically, in accordance with example implementations, a user may use a mobile electronic device 150 (here, a tablet computer) for purposes of locating an object (here, a television 164) in a room 100. The mobile electronic device 150 has a display 160 on a front facing surface of the electronic device 150, and a camera 200 (FIG. 2) of the electronic device 150 captures images that are viewed through an opening (not shown) in the rear facing surface of the device 150. For this example implementation, the display 160 displays an image that forms a camera viewfinder 161 for the electronic device 150. In this regard, the orientation of the mobile electronic device 150 (as controlled by the user) controls the orientation of the camera's optical axis, and the camera 200 captures an image that coincides with its optical axis. For the example depicted in FIG. 2, the camera 200 images a portion 110 of the room 100, and an image 165 of the television 164 appears in the camera viewfinder 161 near the center of the display 160.

In accordance with example implementations, the mobile electronic device 150 includes a unidirectional antenna 224 that has a maximum gain along a direction that coincides with (parallel to, for example) the optical axis of the camera 200 so that the antenna 224 is most sensitive to energy (if any) that is emitted from an object that is displayed in a predetermined portion (a central portion, for example) of the viewfinder 161. In accordance with example implementations, an object detection engine 210 (FIG. 2) of the mobile electronic device 150 uses the energies that are sensed by the unidirectional antenna 224 and an omnidirectional antenna 220 of the electronic device 150 to determine whether the object being detected appears in the viewfinder 161.

For the example depicted in FIG. 1, at the beginning of the search for the television 164, the object detection engine 210 may wirelessly communicate with the television 164 to cause the television 164 to radiate, or transmit, electromagnetic energy (the object detection engine 210 may initiate wireless polling by the television 164, for example). In this manner, the object detection engine 210 may be aware of an identifier for the object and communicate with the object using the identifier to cause the object to radiate energy. In accordance with some implementations, the object being located (such as television 164) is instructed by the object detection engine 201 to emit a selected form of energy (perform Bluetooth polling, for example), which allows at least some degree of discrimination of the object from other nearby wireless devices that may be transmitting.

For the example depicted in FIG. 1, the energy transmitted by the television 164 allows the object detection engine 210 to monitor signals that are received by the unidirectional antenna 224 and the omnidirectional antenna 220; and from this monitoring, the object detection engine 210 determines whether the image 165 of the television 164 appears in the camera viewfinder 161. When this occurs, the object detection engine 210 may provide an output to alert the user that the image of the object (here, television image 165) appears in the camera viewfinder 161. For the specific example of FIG. 1, the indicator is an image 162 of an "X" within the camera viewfinder 161, which, in accordance with example implementations, may coincide with the position of the object image (here, television image 165) in the camera viewfinder 161.

In accordance with example implementations, the object detection engine 210 determines one or multiple differences in the radio frequency (RF) signals that are received by the omnidirectional antenna 220 and the unidirectional antenna 224, and the object detection engine 210 uses the difference(s) to detect whether the object appears in the viewfinder 161. For example, in accordance with example implementations, the object detection engine 210 may make this determination based on one or multiple of the following characteristics: a difference in signal strengths; a timing difference; a phase difference; a weighted or unweighted combination of one or multiple of these differences; and so forth.

As a more specific example, in accordance with some implementations, the object detection engine 210 determines a received signal strength indicator (RSSI) associated with the omnidirectional antenna 220 and determines a RSSI associated with the unidirectional antenna 224. The RSSIs may be provided by a radio of the mobile electronic device 150, for example. Based on the RSSIs, the object detection engine 210 may make a determination of whether the camera 200 of the electronic device 150 is pointing toward the object emitting the energy (i.e., determine whether the object appears in the viewfinder 161).

Figure 3:
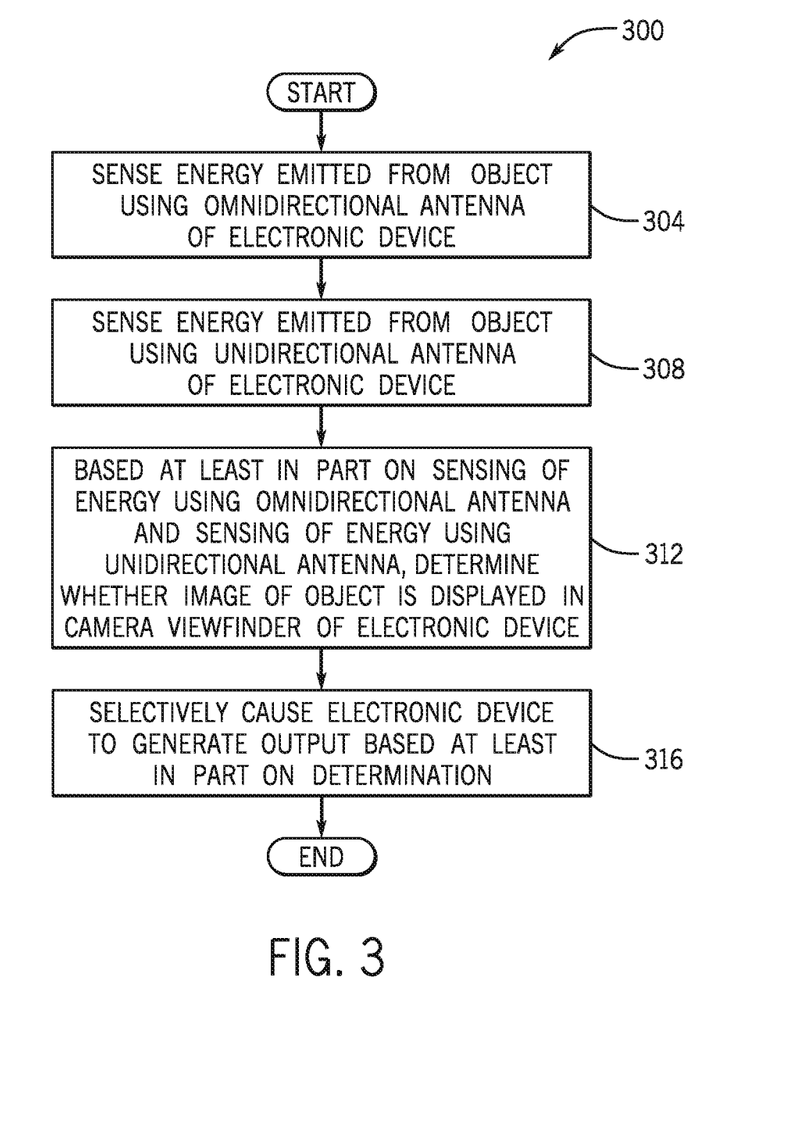
FIGS. 3 and 4 are flow diagrams depicting techniques used by an object detection engine of the mobile electronic device to identify whether of an object is located in a camera viewfinder of the device according to example implementations.

Thus, referring to FIG. 3 in conjunction with FIGS. 1 and 2, in accordance with example implementations, a technique 300 includes sensing (block 304) energy emitted from an object using an omnidirectional antenna of an electronic device and sensing (block 308) energy emitted from the object using a unidirectional antenna of the electronic device. Pursuant to the technique 300, based at least on part on the sensing of energy using the omnidirectional antenna and the sensing of the energy using the unidirectional antenna, a determination is made (block 312) whether an image of the object is displayed in a camera viewfinder of the electronic device. The technique 300 includes selectively causing (block 316) the electronic device to generate an output based at least in part on the determination.

Figure 4:
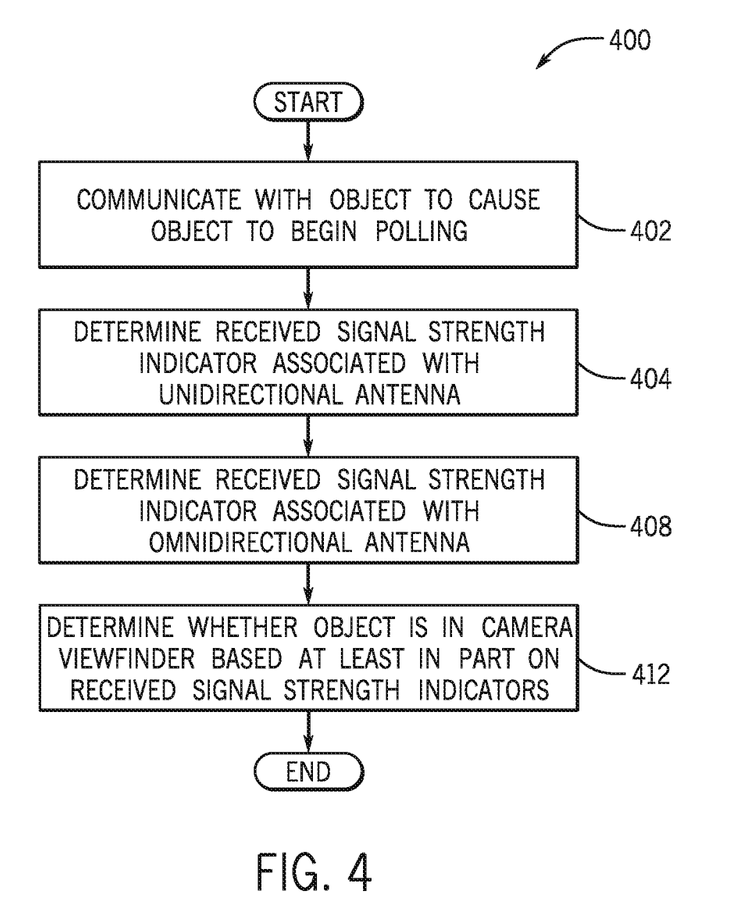

In accordance with some implementations, the object detection engine 210 may identify an object using a technique 400 that is depicted in FIG. 4. Referring to FIG. 4 in conjunction with FIGS. 1 and 2, pursuant to the technique 400, the object detection engine 210 may communicate (block 402) with the object to cause the object to begin polling. The object detection engine 210 may then determine (block 404) a received signal strength indicator (RSSI) associated with its unidirectional antenna and determine (block 408) an RSSI associated with its omnidirectional antenna. The object detection engine 210 may then determine (block 412) whether the object is in the camera viewfinder based at least in part on the RSSIs.

Figure 5:
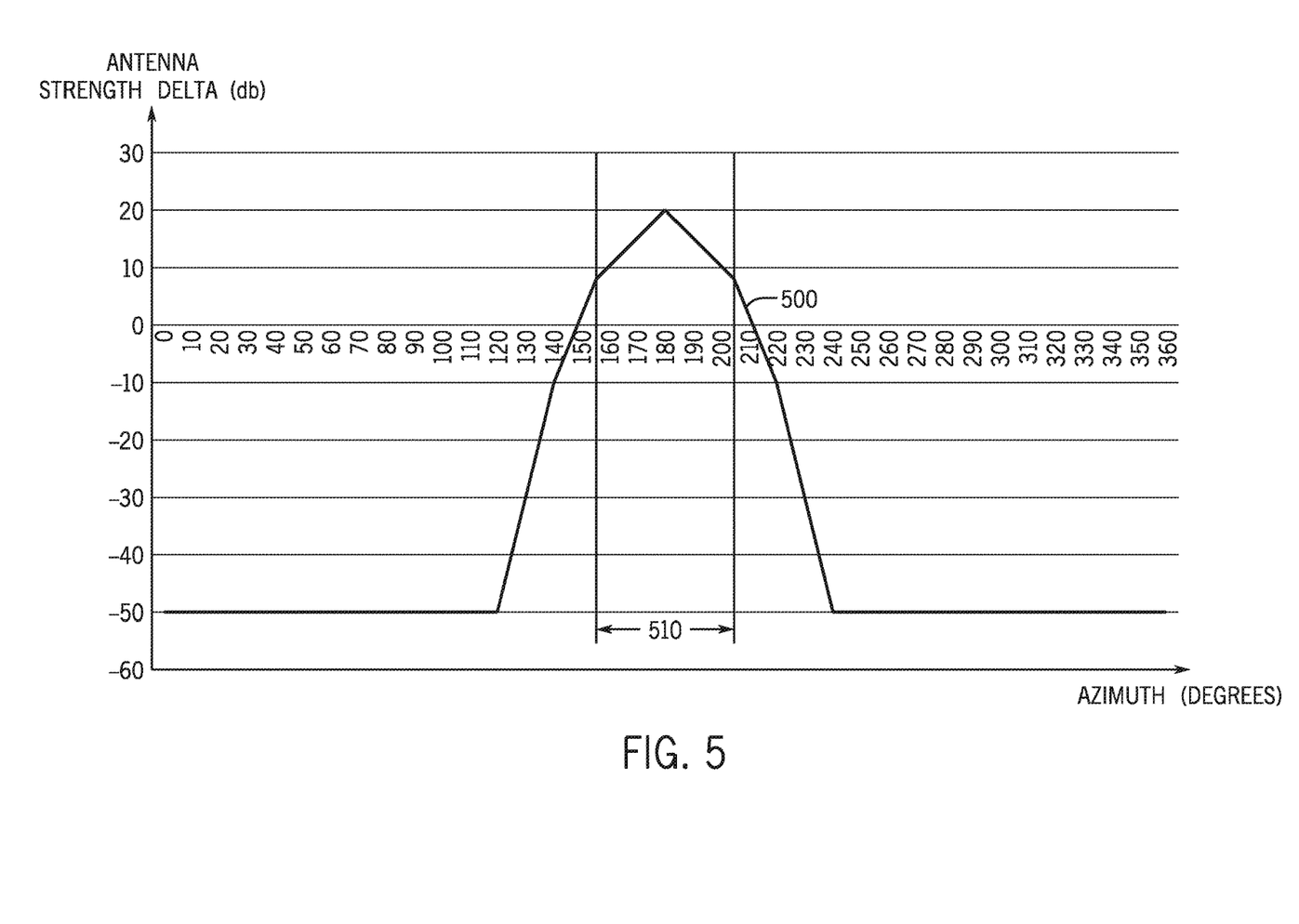
FIG. 5 is an illustration of an antenna strength delta indicator according to an example implementation.

Referring to FIG. 5 in conjunction with FIGS. 1 and 2, in accordance with some implementations, the object detection engine 210 subtracts the RSSI associated with the unidirectional antenna 224 from the RSSI associated with the omnidirectional antenna 200 to derive an antenna strength delta indicator 500. The object detection engine 210, in accordance with example implementations, uses the antenna strength delta indicator 500 to determine whether the image of the object is within the camera viewfinder 161.

As shown in FIG. 5, the indicator 500 may vary with the azimuth of the object relative to the mobile electronic device 150. When the camera 200 is oriented to capture images at the rear of the mobile electronic device 150 (as depicted in FIG. 1), then, in accordance with example implementations, the object appears in the camera viewfinder 161 at an azimuth near 180 degrees. In accordance with example implementations, the object detection engine 210 compares the antenna strength delta indicator 500 to a predefined threshold, such as 8 decibels (dB). For the example implementation of FIG. 5, when the antenna strength delta indicator 500 is above the 8 dB threshold, then the object is located with a relatively narrow azimuthal range 510 (here, an example of an azimuthal range of 155 to 205 degrees) about the 180 degree azimuth.

Although FIG. 5 depicts the antenna strength delta indicator 500 varying as a function of azimuth, the antenna gain pattern of the unidirectional antenna 224 may be a three-dimensional (3-D) pattern that varies with both an azimuth and a theta (altitude). In other words, in accordance with example implementations, the unidirectional antenna 224 has an associated maximum gain direction, and a directional difference between the direction of the energy that is received by the antenna 224 and the maximum gain direction may be represented by a 3-D angular vector having azimuth and altitude components. In accordance with example implementations, the center of the viewfinder 161 coincides with the maximum gain direction (the optical axis of the camera 200 is parallel with the 3-D maximum gain direction of the unidirectional antenna 224, for example), so that the antenna strength indicator 500 approaches or reaches its apex when the object appears in the camera viewfinder 161.

In accordance with example implementations, the object detection engine 210 augments the detection of the object by sensing one or multiple outputs of the object other than radiated energy. For example, in accordance with some implementations, the object detection engine 210 may communicate with the object to cause the object to generate a light or sound cue, which the engine 210 uses (in addition to the antenna strength delta indicator) for purposes of identifying the target object. In accordance with further example implementations, the object detection 210 may identify the target object using other techniques, such as signal delay propagation measurements, infrared (IR) polling, radio frequency (RF) fingerprinting, audio or visual cues, image recognition, and so forth. In accordance with further example implementations, the object may communicate metadata, which describes the configuration information about the object. In the manner, the object detection engine 210 may assign weights to the above-described antenna strength delta indicator 500 and one or multiple other indicators to derive a composite indicator that the object detection engine 210 uses to determine whether the object appears in the camera viewfinder 161.

In accordance with some implementations, a user may desire to locate a given object and request configuration information for the object. For example, such configuration information may identify characteristics of the object's hard disk drive, memory, central processing unit (CPU), basic input/output operating system (BIOS), operating system (OS), software configuration (firewall, encryption status, etc.), and so forth. Moreover, the configuration information may indicate whether the object complies with certain policy compliance specifications.

Figure 6A:
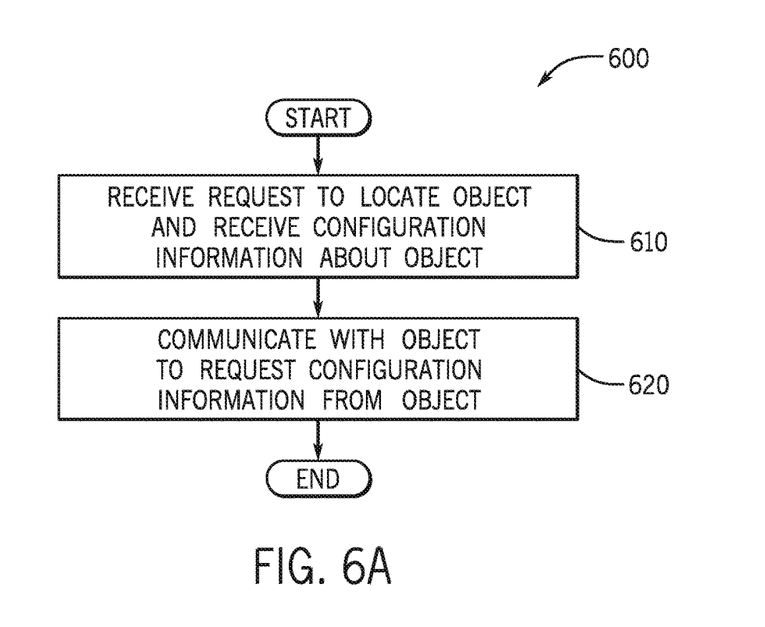
FIGS. 6A and 6B are flow diagrams depicting techniques to retrieve configuration information for an electronic device according to example implementations.

More specifically, in accordance with example implementations, the object detection engine 210 may perform a technique 600 that is depicted in FIG. 6A. The technique 600 includes receiving (block 610) a request to locate an object and receive configuration information about the object. Pursuant to the technique 600, the object detection engine 210 communicates (block 620) with the object to request the configuration information from the device, pursuant to block 620.

Figure 6B:
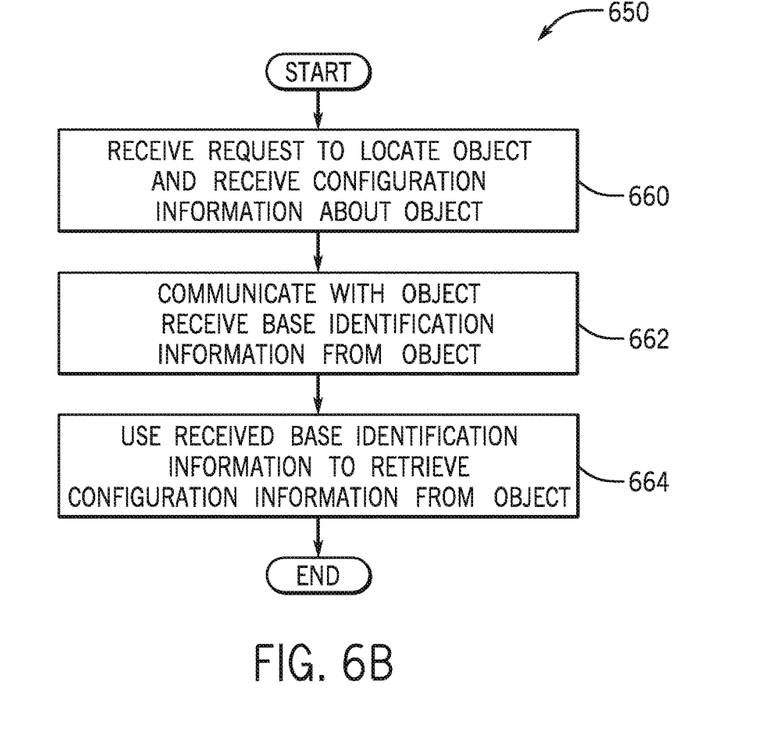

In accordance with further example implementations, the object detection engine 210 indirectly obtains the configuration information. More specifically, referring to FIG. 6B, in accordance with example implementations, the object detection engine 210 may perform a technique 650 that includes receiving (block 660) a request to locate an object and a request to receive configuration information about the object. Pursuant to block 662, the object detection engine 210 communicates with the object to receive base identification information from the object. In this regard, the "base identification" information refers to such information as the device serial number or a unique universal identification (UUID) of the object. The object detection engine 210 may then use (block 664) the received base identification information to retrieve configuration information about the object. For example, the object detection engine 210 may receive the information from a backend assist device, such as a cloud, a system center configuration manager (SSCM), and so forth.

As mentioned above, in accordance with example implementations, the object detection engine 210 may cause the object to begin polling at the onset of a process to locate the object. It is noted that the object may, at the time of the request, be in reduced power consumption state, such as a sleep or idle state. The object detection engine 210 may therefore use a wake from sleep protocol, such as one of the protocols used for Bluetooth or wireless local area networks (WLANs), for purposes of awakening the object and causing the object to begin polling.

In accordance with further example implementations, the object may contain an "always-on" component. For example, the object may be a network client, which contains an embedded controller. When powered by a battery or AC source, the embedded controller may remain operational, even for a low power consumption state. The embedded controller may adhere to a duty cycle to, for low power consumption states of the client, periodically wake up a wireless radio of the client at regular intervals to configure the client for wireless communication. After transitioning to a higher power consumption state, the network client may poll at a more frequent frequency to allow for more robust and accurate detection.

In accordance with example implementations, the object may include information (MAC addresses, and so forth) in its polling data, which the object detection engine 210 may use to augment the object's location determination. The object may provide information within its beacon (such as a serial number) for purposes of aiding its detection. The object may also provide other information within its beacon, such as serial number or metadata providing information about configuration parameters of the object.

Figure 7:
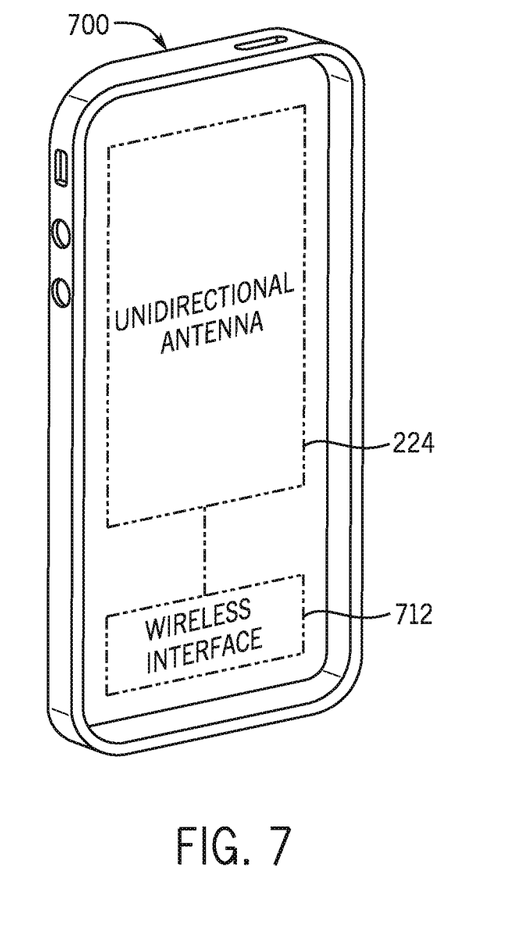
FIG. 7 is a perspective view of a case for a mobile electronic device according to an example implementation.

Referring to FIG. 7, in accordance with example implementations, the unidirectional antenna 224 may be provided by a case, or cover, for the mobile electronic device 150. For example, referring to FIG. 7, in accordance with example implementations, a protective case 700 for the mobile electronic device 150 may include the unidirectional antenna 224. The case 710 may further include a wireless interface 712 (a Bluetooth interface, for example), which allows the mobile electronic device 150 to communicate with the unidirectional antenna 224.

Figure 8:
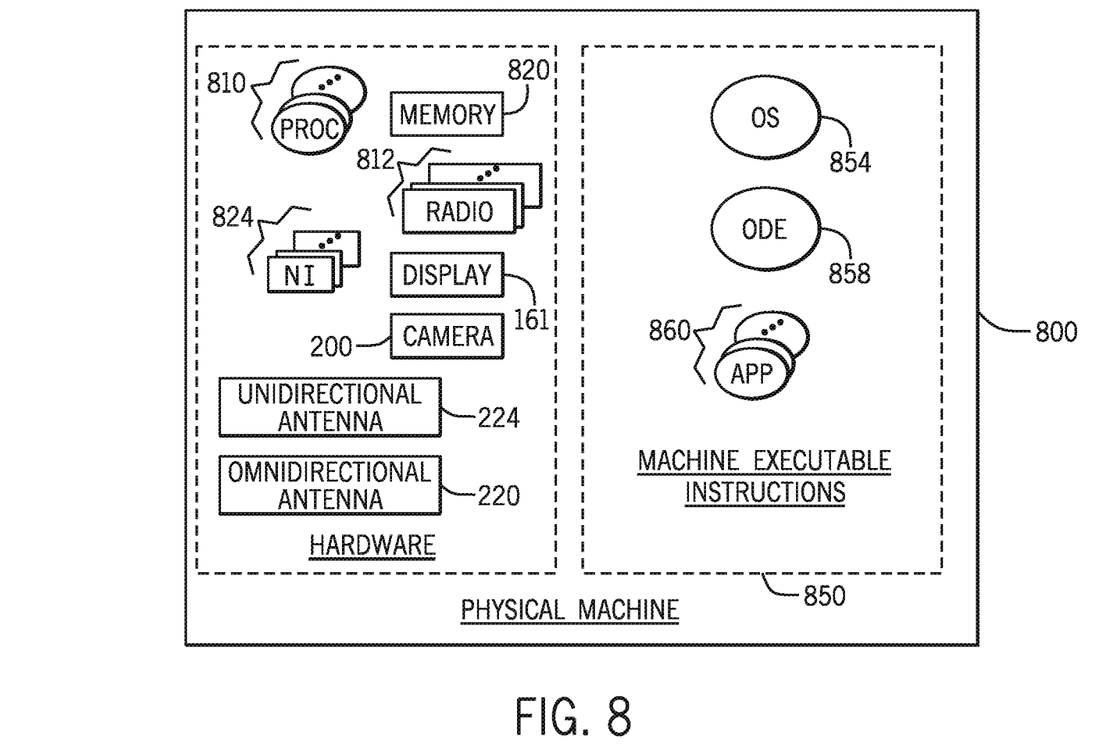
FIG. 8 is a schematic diagram of a physical machine according to an example implementation.

In accordance with example implementations, the mobile electronic device 150 may be a physical machine, such as physical machine 800 that is depicted in FIG. 8. In this manner, referring to FIG. 8 in conjunction with FIG. 2, the physical machine 800 is an actual machine that is made up of actual hardware 802 and machine executable instructions 850, or "software." As an example, the hardware 802 may include one or multiple processing cores 810 and a memory 820. In general, the memory 820 is a non-transitory memory that may include semiconductor storage devices, magnetic storage devices, memristors, phase change memory devices, a combination of one or more of these memory devices, and so forth. In general, the memory 820 may store one or more machine executable instructions for execution by one or multiple processor cores 810. As also depicted in FIG. 8, the hardware 802 of the physical machine 800 may include one or multiple network interfaces 824, one or multiple radios 822, the display 161, the camera 200, the unidirectional antenna 220, the omnidirectional antenna 224, and so forth. The machine executable instructions 850 may include instructions 854 that when executed by one or multiple processing cores 810 cause the processing core(s) 810 to form an operating system; a set of instructions 858, that when executed by the processing core(s) 810 cause the processing core(s) 810 to form the object detection engine 210; one or multiple sets of instructions 860 that when executed by the processing core(s) 810 cause the processing core(s) 810 to form one or multiple applications; and so forth.

In accordance with further example implementations, one, multiple or all of the components of the object detection engine 210 may be formed from dedicated hardware components. Thus, depending on the particular implementation, the object detection engine 210 may be formed from hardware, from software, or from a combination of hardware and software.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   sensing, using an omnidirectional antenna of an electronic device, a first energy of a signal emitted from an object;
   sensing, using a unidirectional antenna of the electronic device, a second energy of the signal emitted from the object;
   based at least in part on the sensing of the first energy using the omnidirectional antenna and the sensing of the second energy using the unidirectional antenna, determining whether the object is within a specified range of an optical axis of a camera of the electronic device such that an image of the object is displayed in a camera viewfinder of the electronic device; and
   selectively causing the electronic device to generate an output based at least in part on the determination.

2. The method of claim 1, wherein selectively causing the electronic device to generate the output comprises selectively displaying an image in the camera viewfinder to identify the image of the object.

3. The method of claim 1, wherein the sensing of the second energy of the signal emitted by the object using the unidirectional antenna comprises sensing the second energy using the unidirectional antenna aligned with the optical axis of the camera.

4. The method of claim 1, wherein:
   sensing the first energy of the signal using the omnidirectional antenna comprises sensing a first signal strength of the signal using the omnidirectional antenna;
   sensing the second energy of the signal using the unidirectional antenna comprises sensing a second signal strength of the signal using the unidirectional antenna; and
   generating an indicator based on the first and second signal strengths representing whether the object is within the specified range of the optical axis of the camera.

5. The method of claim 1, further comprising:
   communicating a request from the electronic device to initiate polling by the object.

6. The method of claim 4, wherein generating the indicator based on the first and second signal strengths comprises generating the indicator based on a difference between the first signal strength and the second signal strength.

7. An apparatus comprising:
   a unidirectional antenna;
   an omnidirectional antenna;
   a camera;
   a display to display an image captured by the camera; and
   a processor to:
      use the omnidirectional antenna to measure a first signal strength of a signal emitted by a device;
      use the unidirectional antenna to measure a second signal strength of the signal emitted by the device; and
      based at least in part on the detected first and second signal strengths, selectively provide an indication in the image displayed by the display to indicate detection of the device.

8. The apparatus of claim 7, wherein the processor is to:
   provide the indication further based on a further output of the device in addition to the first and second signal strengths.

9. The apparatus of claim 8, wherein the further output comprises a signal delay propagation in the signal emitted by the device, an infrared signal emitted by the device, a radio frequency (RF) fingerprint associated with the device, a visual output of the device, or an audio output of the device.

10. The apparatus of claim 7, wherein the processor is to send a request to the device to cause the device to communicate information describing a configuration of the device.

11. The apparatus of claim 7, wherein the processor is to:
    send a request to the device to cause the device to communicate data describing an identifier for the device; and
    use the data to retrieve additional data describing a configuration of the device.

12. The apparatus of claim 7, further comprising a protective case, wherein the unidirectional antenna is part of the protective case.

13. An article comprising a non-transitory computer readable storage medium to store instructions that when executed by a computer cause the computer to:
    receive a first indicator of a first energy of a signal emitted from an electronic device, the first energy sensed using an omnidirectional antenna of the computer;
    receive a second indicator of a second energy of the signal emitted from the electronic device, the second energy sensed using a unidirectional antenna of the electronic device;
    based at least in part on the first indicator and the second indicator, determine whether the electronic device is within a specified azimuthal range of an optical axis of a camera of the computer such that an image of the electronic device is displayed in a display of the computer; and
    selectively cause the computer to provide an output based at least in part on the determination.

14. The article of claim 13, wherein the first indicator comprises a first signal strength of the signal sensed using the omnidirectional antenna, and the second indicator comprises a second signal strength of the signal sensed using the unidirectional antenna, and wherein the determination of whether the electronic device is within the specified azimuthal range of the optical axis of the camera is based on a difference between the first signal strength and the second signal strength.

15. The method of claim 1, wherein the first energy comprises a first electromagnetic energy sensed using the omnidirectional antenna, and the second energy comprises a second electromagnetic energy sensed using the unidirectional antenna.

16. The method of claim 6, further comprising:
   comparing the difference between the first signal strength and the second signal strength to a threshold,
   wherein the indicator is generated responsive to the difference exceeding the threshold.

17. The method of claim 1, wherein the unidirectional antenna has a gain pattern that is sensitive to a direction of the signal received by the unidirectional antenna, and a maximum peak gain of the unidirectional antenna is in a direction that is aligned with the optical axis of the camera.

18. The apparatus of claim 7, wherein the providing of the indication is based on a difference between the first signal strength and the second signal strength.

19. The apparatus of claim 18, wherein the indication is provided responsive to the difference exceeding a threshold.

20. The article of claim 14, wherein the instructions when executed by the computer cause the computer to:
   compare the difference between the first signal strength and the second signal strength to a threshold,
   wherein the determination of whether the electronic device is within the specified azimuthal range of the optical axis of the camera is based on the difference exceeding the threshold.

\* \* \* \* \*